United States Patent [19]

Carley et al.

[11] Patent Number: 4,923,731
[45] Date of Patent: May 8, 1990

[54] NOVEL PREFORM SCREENS AND PREFORM PRODUCT

[75] Inventors: Earl P. Carley, New Kensington; Philip L. Schell, Pittsburgh, both of Pa.

[73] Assignee: PPG Industries, Inc., Pittsburgh, Pa.

[21] Appl. No.: 290,065

[22] Filed: Dec. 27, 1988

[51] Int. Cl.$^5$ .............................................. B32B 3/10
[52] U.S. Cl. .................................. 428/131; 428/285; 428/542.8
[58] Field of Search ............. 428/131, 137, 285, 542.8

[56] References Cited

U.S. PATENT DOCUMENTS

| 4,466,845 | 8/1984 | Fortuna | 428/542.8 |
| 4,556,594 | 12/1985 | Sedlatschek | 428/542.8 |
| 4,631,218 | 12/1986 | Olofsson | 428/131 |

Primary Examiner—James J. Bell
Attorney, Agent, or Firm—John E. Curley

[57] ABSTRACT

A novel preform screen for use in producing preforms for structural liquid composite molding is described. The screen has a raised edge provided around the screen to catch fibers as they are directed toward the screen surface during production of a preform. The preforms produced have a perimeter which is composed of chopped rovings oriented parallel to the edges of the preform.

8 Claims, 3 Drawing Sheets

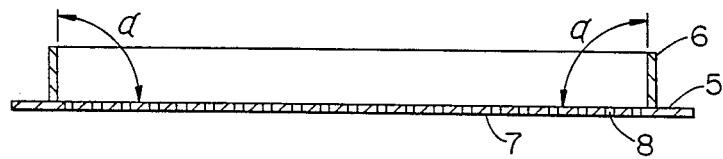
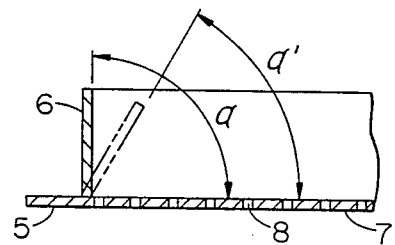
FIG. 3
FIG. 4
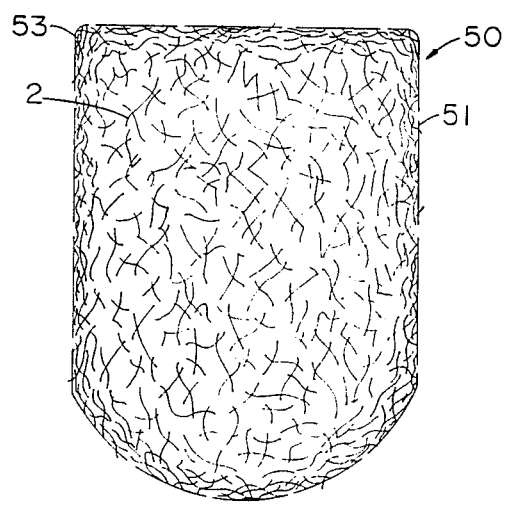
FIG. 5

NOVEL PREFORM SCREENS AND PREFORM PRODUCT

The present invention relates to preform screens utilized to produce preforms for structural liquid composite molding. Still more particularly, the present invention relates to novel preform screens constructed to substantially reduce waste and provide preform products which have high structural integrity around the edges. Still more particularly the present invention relates to preform products which have fiber orientation around the periphery of the preforms contributing to substantial structural integrity and to preform screen arrangements which provide for preforms requiring little or no trim prior to molding.

BACKGROUND OF THE INVENTION

Considerable growth has occurred in the field of structural liquid composite molding which in the art is often called liquid composite molding or structural reaction injection molding. For purposes of the present application all of these processes will be referred to for simplicity as structural liquid composite molding. In the manufacture of molded parts by structural liquid composite molding two basic processes in regard to the preform reinforcement production are employed. One involves the use of thermoformable continuous strand mats and the other process involves the utilization of multi-end roving in chopped form. The invention of this application is directed to the utilization of glass fiber rovings in chopped form and the formation of a preform on a preform screen from these rovings either above or mixed with other strands or rovings such as continuous strands or rovings.

In one process employed today to prepare preforms for use in structural liquid composite molding to prepare the fiber reinforcement, choppers are used. The choppers fracture, break or sever the glass fiber rovings used into discreet bundles which are transported out of the chopper with an air blower. As the chopped roving leaves the chopping machine, binder is applied to them. The chopper is normally connected to a hose-like mechanism that is used to convey the chopped glass in the air from the blower toward the preform screen. The chopped fibers are sprayed with binder as they leave the hose and before they reach the perforated metal screen. The preform screen is shaped in a form identical to the part that is to be molded. When the requisite amount of resin impregnated glass is placed on the screen, it is cured on the screen. After curing, the resin impregnated glass, now a preform, is ready for removal from the screen and for use in a mold. The preform part so made is placed in the mold and the mold is then closed. A low viscosity resin is then injected into the mold, and typically the mold is heated to provide the requisite heat. The heat is applied to the mold for a time sufficient to accomplish curing of the resin injected therein. After curing, the molded part is removed for use.

The typical preform screen utilized to prepare the preforms of the instant invention is mounted on a generally flat, solid metal frame section. The perforated section or screen is surrounded by the flat, solid metal transition frame. The screens normally are shaped to conform to the contour of the part that is to be molded, and in the transition area, i.e., the area between the screen portion and its attachment to the machine on which it is employed, there is a flat solid metal area or frame which is used to mount the screen to the preform machine. These screens have been found in the past to produce satisfactory parts, but there is a problem with excessive trim. The glass fibers in the transition area from screen to flat metal frame accumulate on the walls of the frame and stick thereto. The resulting preform, as a result, typically has peripheral edges which are at best ragged, i.e., fibers protrude from the dense portion of the periphery outwardly and prior to molding frequently must be trimmed. It has also been found in the transition area, i.e., the area from the screen to the flat metal frame where the screen is mounted on the preform machine, that there is a tendency for the part to contain a gradual transition in density of the fibers from the screen to the flat transition area. This results in edges on preforms produced by these screens which are sometimes weak or inadequate in strength at the edge of the molded part.

THE PRESENT INVENTION

In accordance with the instant invention a preform screen is provided with a wall built around its periphery and between the screen and the frame. The wall is angled from the surface of the frame, typically at angles between about 15° and 90°, preferably 30° to 90°. When utilizing a fiber directed process for applying chopped fibers and resin to these screens the chopped roving tends to orient itself parallel with the edge of the wall of the preform screen. This orientation results in a novel preform product which possesses random chopped rovings oriented parallel with the edge of the preform and a smooth edge to the preform. The formation of a preform which has a substantially smooth edge is advantageous since it requires little or no trimming. Further, the preforms of the instant invention characteristically have added edge strength since the orientation of the chopped strands is parallel to the edge of the part. This prevents crack propagation inward on a molded part when it is subjected to secondary operations such as trimming or during ultimate end use of the part. Thus, the part molded from the preform has a reduced tendency to permit crack on any edge to propagate to the major portion of the part.

BRIEF DESCRIPTION OF THE DRAWINGS

For a more complete understanding of the present invention reference is made to the accompanying drawings in which:

FIG. 3 is a cross section of the preform screen of FIG. 2 taken along lines 33;

FIG. 4 is a partial enlarged cross section of the left side of FIG. 3 showing the angles of the side wall to the base;

FIG. 5 is a plan view of a preform of the instant invention; and

DETAILED DESCRIPTION OF THE INVENTION

Figure 1:
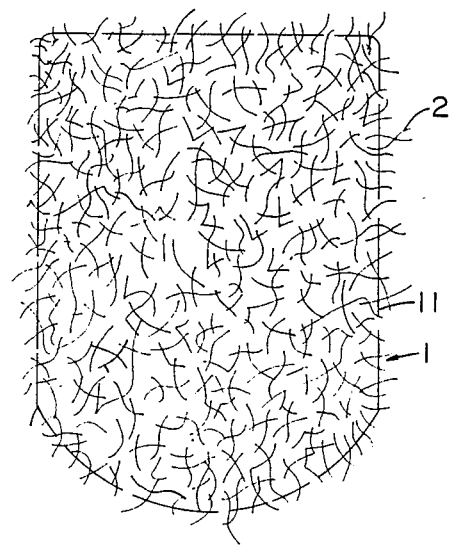
FIG. 1 is a diagrammatic illustration of a preform of the prior art.

FIG. 1 depicts a prior art preform 1 which, as can be seen, is composed of randomly oriented chopped rovings 2 which haphazardly overlay the edge 11 of the preform 1. Rovings 2, which consist of a bundle of strands, are normally used to prepare preforms. Strands are consolidated bundles of fibers. Thus, a roving contains many strands which in turn contain many fibers. During chopping of rovings the consolidated strands forming the rovings can separate as can the fibers forming the strands in the roving. As a result, the surface of the preform screen 7 can be covered with strands and fibers as well as the chopped rovings producing those strands and fibers. For convenience the term 'rovings' will be used to include rovings, strands and fibers that deposit on the preform. The extent to which the rovings 2 extend outwardly from the edge 11 and the quantity of rovings 2 which project from the edge 11 can have adverse effects during the structural liquid composite molding of a part from the preform 1. Thus, if the amount of rovings protruding from the edge 11 of the preform is extreme, the part can require considerable trimming. If the roving density is sufficient in the areas protruding from the edge 11 of the preform 1, some of the resin injected into the mold when the preform is subjected to molding can escape during injection since the protruding rovings can prevent the mold from closing properly. Finally, the edges 11 of the finished molded part made from preform 1 are frequently unevenly reinforced causing the part to fail by cracking along a weak edge.

In contrast, FIG. 5 shows a typical preform 50 of the instant invention. As can be readily seen, the body of the preform 50 has randomly oriented rovings 2 throughout. The edge 51, however, is characterized by having a definitive border 53 comprising rovings which are oriented in a substantially parallel relationship to the edge 51 of the preform 50. This border 53 has been found on preform 50 to provide substantial edge strength to the molded part derived from the preform 50 when it is molded into a part with the requisite resin. The border 53 provides a periphery in the finished preform 50 which is generally denser than the body of the preform and which contributes to providing molded parts of enhanced edge strength.

Figure 2:
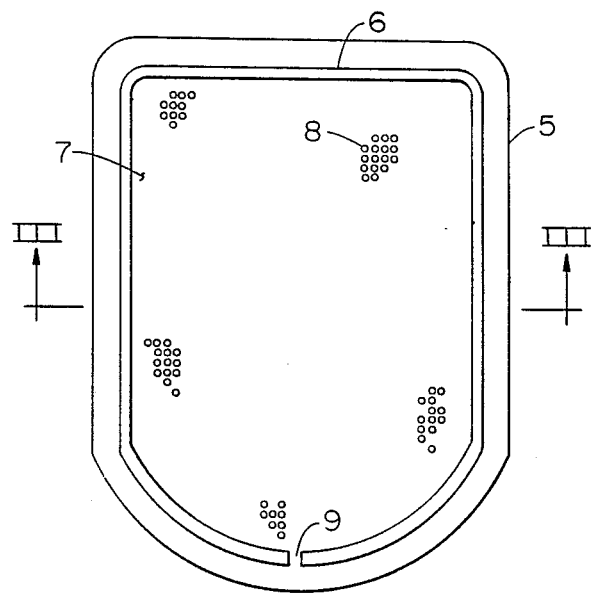
FIG. 2 is a plan view of a preform screen of the instant invention.

Turning to FIGS. 2, 3 and 4 the preform screen 7 of the instant invention is shown in detail. The preform screen 7 is provided with a multiplicity of holes 8 therein. The screen 7 has a solid edge or frame portion 5 which forms the perimeter of the preform screen 7. Located around the edge of the screen 7 is a solid wall member 6 which is generally raised above the frame 5 and screen 7. This wall 6 has a slot 9 provided at one end of the preform screen 7 which is open from the upper surface of the frame 5 to the top surface of the wall 6. The wall 6 is, as shown more clearly in FIGS. 2 and 3, angled from the surface of the frame 5 at between 90° to something less than that and has a height sufficient to cause rovings sticking the sides of the screen 7 to be deflected and oriented in the direction of flow of the fluid transporting them to the surface of the screen 7. In general, the angle between the surface of frame 5 and the wall 6 rising from it is generally between about 30° to about 90°. It can be less than 30° but is usually not greater than 90° since the fibers will tend to not collect and orient at angles greater than 90°.

Figure 6:
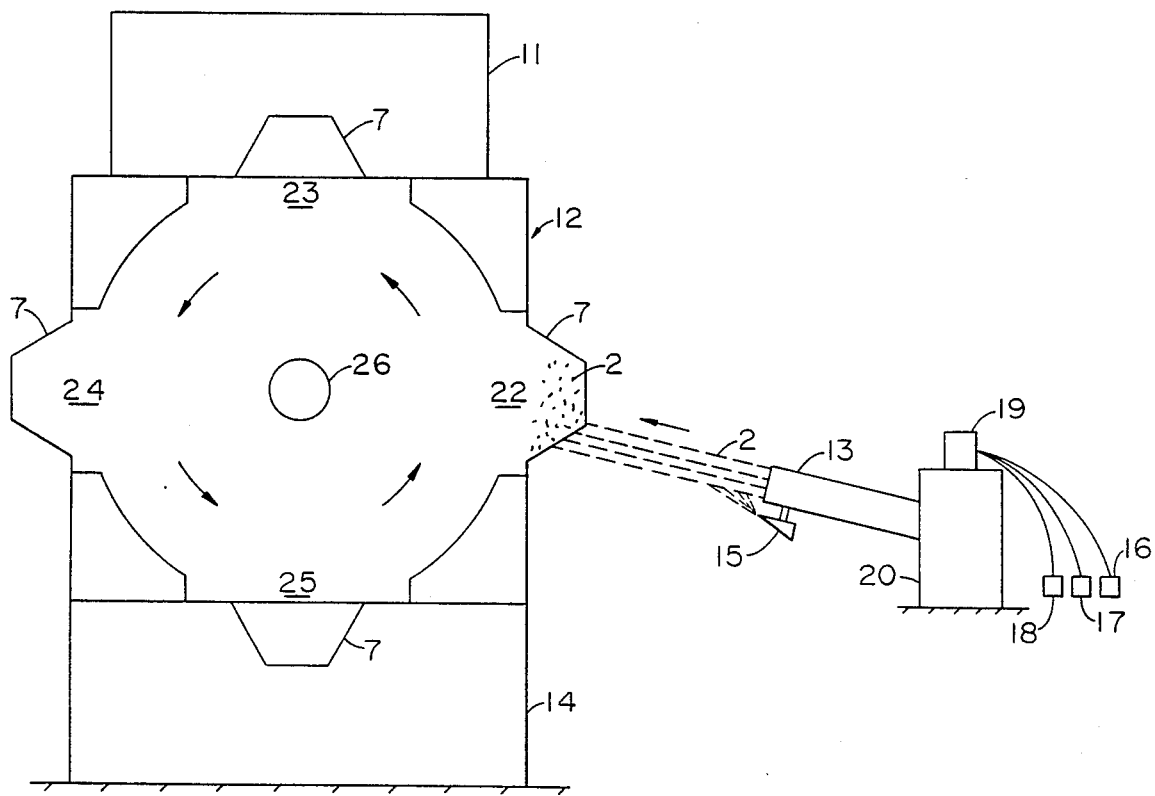
FIG. 6 is a diagrammatic side elevation of a rotary preform machine suitable for use with the screens of the instant invention.

Turning to FIG. 6, preforms are prepared in accordance with the instant invention by placing the preform screen 7 on a preform machine such as the rotary multi-station preform machine generally indicated as 12. The preform screen 7 is mounted on a frame 21 of the machine 12. The machine 12 has a multiplicity of stations 22, 23, 24 and 25. The screen 7 is mounted to the machine frame 21 through holes provided in the screen frame 5 and with appropriate fasteners such as nuts and bolts (not shown). The frame 21 is attached to and is rotated by the shaft 22. The shaft 26 is rotated by a motor (not shown). The machine 12 is designed so that the shaft 26 rotates in 90° increments as will be further explained.

At the top of the rotating frame member 21 and the communicating with the station 23 is a chamber 11 which is typically a hot air oven plenum chamber. Any preforms on the screen 7, which are indexed to opening 23 from the working station 22, are thus subjected to exposure to a hot fluid such as air for a period of time sufficient to cure the resin in the chopped rovings 2 on the screen 7. This consolidates the resin and rovings into a chopped roving preform such as shown in FIG. 5.

The station 24 is the unloading station, and at this station the preform on the screen 7 rotated from the oven area 11, is taken off the preform screen 7. The preform is removed at this station 24 by inserting a tool in the slot 9 of the wall 6 (shown in detail in FIG. 2) and the preform 5 is then gently lifted from the surface of screen 7. The preform screen 7 located in station 25 is merely a spare which is moved into position at station 22 when the preform screen 7 being filled in that station is moved to the next station 23 in chamber 11 for curing.

Positioned at a point in front of the station 22 is a chopping unit 20 which is equipped with a chopper 19 and a chute member 13 associated with the chopper discharge. The chute also has associated with it a resin spray device 15 located near its end which is connected to a resin supply (not shown). This spray device 15 directs resin into the chopped rovings exiting the end of the chute 13. That resin spray provides a coating on the chopped rovings 2 exiting the chute 13. As shown, roving packages 16, 17 and 18 feed rovings 16, 17 and 18 to the chopper 19 when the machine 20 is started, and the chopped rovings 2 are directed as they are chopped into the chute 13. The chopped rovings 2 are propelled onto the screen 7 by means of a blast of fluid, typically air, which is provided to chute 13 from a blower (not shown) which is attached to or built into the chopping machine 20. Preferably the chopper 19, the resin spray 15 and the blower are operated from a central control panel that delivers the quantity of resin and rovings needed for a given preform in a timed sequence which starts all the units automatically and shuts them off in the same way. The chute 13 can rotate in a circular plane so that it can direct the rovings onto the screen 7 as the operator wishes.

In preparing a preform the operator set the timer for a given part at the control panel and turns on the machine 20. At its inception work stations 22, 23, 24 and 25 each have an empty screen 7 located in them. The chopper 19 is activated when the machine is turned on and pulls rovings 2 from packages 16, 17 and 18 through its chopper heads. The rovings 2 are passed as they are chopped into chute 13 where they are directed toward the screen 7 in station 22 by an air fed into chute from a blower in machine 20. Resin is sprayed onto the chopped rovings 2 as they exit the chute 13 and before they reach the surface of screen 7 from the spray gun 15. The rovings 2 impregnated with resin are directed by the chute 13 onto the screen 7 until the holes 8 in the screen 7 are completely covered. The chute 13 directs the rovings 2 onto the screen, and the wall 5 deflects the rovings 2 that miss the screen so that they tend to orient parallel to the edge of the wall where it is attached to the screen 7. When the amount of roving and resin needed has been deposited, the machine 20 is shut off, usually from a timed switching mechanism that is actuated automatically when the requisite glass and resin have been used.

The oven plenum 11 is constantly supplied with hot gas, typically air, at a temperature sufficient to cure the resin used to bind the rovings 2 together on the preform screen 7. The screen 7 in station 22, which now has had the proper amounts of glass roving and resin applied to form a preform, is now moved on frame 21 by rotating shaft 26 counter clockwise to put that screen in station 23. The screen from reserve station 25 moves into place in station 22 and the screens in station 24 and 23 move into stations 25 and 24 respectively. The screen 7 from station 22 with its preform of resin impregnated glass rovings is cured in station 23 while the deposition of a new preform onto the empty screen 7 that is now in station 22 takes place.

When the next preform is formed in station 22 and is ready to be cured, the frame 21 of machine 12 is indexed again 90°. This will move the now cured preform in station 23 to unloading station 24, the newly formed preform from station 22 to station 23 for curing and the empty screen in station 25 to station 22 for the application of a preform to its screen. As the new preform is prepared, the last prepared one is cured in oven 11 and the cured preform in station 24 is removed and sent to the molding operation for preparation of a part. The sequence above described is continued until the requisite number of preforms have been produced for subsequent molding into parts.

In the illustration in FIG. 6, four rotating stations have been shown. This number is for illustrative purposes only since the number of stations can be more or less than this if desired. The stations further need not be positioned on a rotary device as shown, but could be indexed for example in a linear mode on a conveyor system if desired. To further illustrate the invention, references is made to the following example which was employed to produce a preform for an automobile spare tire cover.

EXAMPLE

A preform screen conforming to the final contour of the molded automobile spare tire cover was welded to a flat solid metal frame member. The screen was provided at its periphery with a wall member welded between the screen and the frame, the wall being angled from the surface of the screen about 30° inwardly toward the screen from the frame and having a height above the screen of about 0.5 inches. The screen was mounted to a rotatable multistation preform machine similar to the machine shown in FIG. 6 and the process will be described with reference to that Figure. The preform machine 12 had four 41' stations and an oven provided air at 250° F. to the plenum 11. The chopper 20 and sprayer 15 operated on a 32 second cycle. A PPG 17 end roving was used as the glass feed and was fed to chopper 19 from 3 roving packages 16, 17 and 18. Chopper 20 was started and the blower activated and operated at 170 cubic feet per minute of air. After 2 seconds the chopper heads in chopper 20 activated and began to chop the rovings passing into them from the roving package. The rovings started to be chopped and applied to the preform screen 7. The resin spray was activated and began spraying resin on the chopped rovings 2 that were being discharged from the chute 13 of the chopper 20. This binder is applied for the next 18 seconds, which includes an 8 second overspray after the chopped roving time was terminated at 20 seconds, for a completed cycle of 32 seconds. During the spraying of the chopped rovings the chute 13 was directed by hand to deposit the rovings over the entire screen surface of the screen 7 to cover it completely. The binder was a polyvinyl acetate emulsion having a solids content of 6 percent by weight and manufactured by Rohm and Haas under the trade name Polyco. A Binks Model 610 spray gun was used to deposit the resin on the chopped rovings at a gun setting of 15 clicks open. The station located in oven 11 was operated with the screen preform deposited on it in that station at the 250° F. for 32 seconds to insure a proper cure before removal of the finished preform.

Preforms which were prepared in accordance with the example were found to conform to the preform shown in FIG. 5. They had a characteristic edge of parallel rovings with little or no material protruding from the edges. When used in molded parts, the preforms prepared by method of the example and using the novel screens employed were found to have mechanical properties in molded composites equivalant to or superior to composites made from thermoformable and non-thermoformable continuous strand mat products.

Table I shows a listing of the mechanical properties obtained from a structural reinforced injection molded urethane resin composite with 40 percent glass by weight prepared using a preform of the instant invention as reinforcement. Those preforms are compared to composite using 40 percent by weight glass loadings as nonthermoformable continuous mat and thermoformable continuous mat. The same urethane resin was used in all composites. Table II lists the physical properties of the same composites of Table I after the composite was subjected to a 25 hour boil in water.

TABLE I

|  | Chopped Fiber Preform | Nonthermoformable Continuous Mat | Thermoformable Continuous Mat |
| --- | --- | --- | --- |
| Tensile Strength[2] | 24,500 | 22,600 | 22,400 |
| Flexural Strength[2] | 36,400 | 33,500 | 36,000 |
| Flexural Modulus[2] | $1.30 \times 10^6$ | $1.20 \times 10^6$ | $1.23 \times 10^6$ |
| Izod Impact[3] | 10.2 | 12.0 | 11.8 |

TABLE II

|  | Chopped Fiber Preform | Nonthermoformable Continuous Mat | Thermoformable Continuous Mat |
| --- | --- | --- | --- |
| Tensile Strength[2,4] | 19,300 | 15,700 | 17,000 |
| % Retention | 79% | 70% | 76% |
| Flexural Strength[2,4] | 31,900 | 22,600 | 24,600 |
| % Retention | 88% | 68% | 68% |
| Flexural Modulus[2,4] | $1.20 \times 10^6$ | $1.02 \times 10^6$ | $1.03 \times 10^6$ |
| % Retention | 92% | 85% | 84% |

[1]40% glass by weight
[2]psi
[3]ft-lbs/inch
[4]After 24 hour water boil

As can be seen, the preforms of the instant invention have excellent mechanical properties and obviously provide preforms of improved appearance and uniformity of edge.

While the invention has been described with reference to certain specific examples and illustrated embodiments, it is not intended to be limited thereby except insofar as appears in the accompanying claims.

We claim:

1. A preform screen adapted for use in producing preforms for subsequent use in a mold comprising a body and solid frame transition zone surrounding said body and wall member encompassing the screen area and providing a raised edge around the screen that is at least ½′ in height and oriented at an angle of between 30° to 90° from the surface of the screen.

2. The preform screen of claim 1 including an open slot in said wall member.

3. A preform screen used to prepare preforms for structural liquid composite molding comprising a screen defining the preform shape, a frame surrounding said screen, a wall member defining the outer perimeter of the screen and rising therefrom a distance of at least 0.5 inches, the wall being angled from the surface of the screen periphery at an angle between 30 to 90°.

4. The screen of claim 3, wherein a slot is provided in said wall.

5. A fiber directed preform comprising a mat of resin impregnated fibers wherein the fibers are randomly distributed throughout the main body of the preform and where the perimeter of the preform has the fibers oriented substantially parallel to the edges of the preform and substantially around the periphery.

6. The preform of claim 5, wherein the substantially parallel fibers forming the perimeter of the preform form a fiber area around the edge of the preform that is denser than the body of the preform they encompass.

7. The preform of claim 5, wherein the fibers are glass fibers.

8. The preform of claim 6, wherein the fibers are glass fibers.

* * * * *